US011369228B2

(12) United States Patent
Caruso

(10) Patent No.: US 11,369,228 B2
(45) Date of Patent: Jun. 28, 2022

(54) CLEANING APPARATUSES AND METHODS

(71) Applicant: SharkNinja Operating LLC, Needham, MA (US)

(72) Inventor: Steven Jerome Caruso, Antioch, IL (US)

(*) Notice: Subject to any disclaimer, the term of this patent is extended or adjusted under 35 U.S.C. 154(b) by 79 days.

(21) Appl. No.: 16/735,675

(22) Filed: Jan. 6, 2020

(65) Prior Publication Data

US 2020/0205605 A1    Jul. 2, 2020

Related U.S. Application Data

(63) Continuation of application No. 15/203,678, filed on Jul. 6, 2016, now abandoned, which is a continuation of application No. 14/813,102, filed on Jul. 29, 2015, now abandoned.

(60) Provisional application No. 62/031,124, filed on Jul. 30, 2014.

(51) Int. Cl.
*A47L 11/08* (2006.01)
*A47J 31/44* (2006.01)
*B01F 27/119* (2022.01)
*A47L 13/12* (2006.01)
*B01F 101/14* (2022.01)

(52) U.S. Cl.
CPC ........... *A47J 31/4485* (2013.01); *A47L 13/12* (2013.01); *B01F 27/119* (2022.01); *B01F 2101/14* (2022.01)

(58) Field of Classification Search
CPC .......... A47L 11/08; A47L 11/18; A47L 11/19; A47L 11/22; A47L 11/24; A47L 11/32; A47L 11/33; A47L 11/4013; A47L 11/4041; A47L 11/4055; A47L 13/12

USPC ..................................... 15/23, 41.1, 42, 114
See application file for complete search history.

(56) References Cited

U.S. PATENT DOCUMENTS

| 488,950 A | 12/1892 | Raymond |
| 781,543 A | 1/1905 | McClay |
| 861,528 A | 7/1907 | Lord |
| 1,300,323 A | 4/1919 | Zdancewicz |
| 2,037,902 A | 4/1936 | Hertzberg |
| 2,557,216 A | 6/1951 | Calabrese |
| 2,982,981 A | 5/1961 | Otto |
| 3,482,273 A * | 12/1969 | Price .................. A47L 11/4041 15/52.1 |
| 3,947,912 A | 4/1976 | Michaels |

(Continued)

FOREIGN PATENT DOCUMENTS

| DE | 2347831 A1 | 4/1975 |
| GB | 635413 A | 4/1950 |

(Continued)

OTHER PUBLICATIONS

U.S. Appl. No. 16/430,386, filed Jun. 3, 2019, Caruso.

*Primary Examiner* — Charles S Bushey

(57) ABSTRACT

New and novel structure(s) for cleaning surfaces have been disclosed. The device may include; a wiping surface, which may be disposable; a brush roll/larger debris gathering mechanism; a local debris storage and/or staging area, and a larger remote debris storage structure. Additionally, there are mechanisms and structures disclosed for powering the brush roll, activating the brush roll from an out of use position to an in use position, waste from one area to another. The invention at hand uniquely and inventively improves upon the known devices in this field.

19 Claims, 11 Drawing Sheets

(56) References Cited

U.S. PATENT DOCUMENTS

| | | | |
|---|---|---|---|
| 6,845,538 B2 * | 1/2005 | Nakamura | A46B 13/02 |
| | | | 15/4 |
| 6,966,098 B2 * | 11/2005 | Sako | A47L 5/28 |
| | | | 15/231 |
| 7,013,528 B2 | 3/2006 | Parker et al. | |
| 7,676,877 B2 | 3/2010 | Policicchio et al. | |
| 8,020,236 B2 | 9/2011 | Kaleta et al. | |
| D657,102 S | 4/2012 | Kaleta et al. | |
| 8,468,633 B2 | 6/2013 | Arnold | |
| 8,572,800 B2 | 11/2013 | Haan | |
| 9,814,364 B1 | 11/2017 | Caruso | |
| 9,974,423 B2 * | 5/2018 | Policicchio | A47L 13/12 |
| 10,357,138 B2 | 7/2019 | Caruso | |
| 11,019,974 B2 * | 6/2021 | Caruso | A47L 11/33 |
| 2003/0204923 A1 | 11/2003 | Nakamura | |
| 2004/0168281 A1 | 9/2004 | Sako et al. | |
| 2007/0214586 A1 | 9/2007 | Mattucci et al. | |
| 2016/0213192 A1 | 7/2016 | Caruso | |
| 2016/0309977 A1 | 10/2016 | Caruso | |
| 2017/0340182 A1 | 11/2017 | Caruso | |

FOREIGN PATENT DOCUMENTS

| | | |
|---|---|---|
| GB | 774399 A | 5/1957 |
| GB | 829550 A | 3/1960 |
| JP | 7-265239 A | 10/1995 |
| WO | WO 2006-005722 A1 | 1/2006 |

* cited by examiner

CLEANING APPARATUSES AND METHODS

RELATED APPLICATIONS

This application is a continuation of U.S. patent application Ser. No. 15/203,678 filed Jul. 6, 2016, entitled "CLEANING APPARATUSES AND METHODS," which is a continuation application of U.S. patent application Ser. No. 14/813,102, entitled "Beverage Agitator—Frother," filed Jul. 29, 2015, which relates to and claims priority to: U.S. Provisional Patent Application No. 62/031,124, filed Jul. 30, 2014, and entitled "Liquid frother and sweeper systems," each of which are all hereby incorporated by reference in their entireties.

TECHNICAL FIELD

Generally, this disclosure relates to cleaning apparatuses and methods, and more particularly to surface cleaning apparatuses and methods.

BACKGROUND

The present invention relates generally to devices for cleaning surfaces.

In the art of devices for cleaning surfaces, there exists a multitude of appliances that each serve a particular function. There are vacuums (that may or may not include a brush roll), there are sweepers (brush-roll only devices), and there are mops and wiping devices. Each have their distinct advantages and disadvantages. The invention at hand seeks to inventively improve upon these devices by combining the positive attributes of each without being encumbered by the negative attributes of each in new and novel ways.

BRIEF SUMMARY

The present invention is a new and novel structure(s) for cleaning surfaces. Embodiments may include; a wiping surface, which may be disposable; a brush roll larger debris gathering mechanism; a local debris storage and/or staging area, and a larger remote debris storage structure. Additionally, there are mechanisms and structures disclosed for powering the brush roll, activating the brush roll, and moving the waste from one area to another.

DETAILED DESCRIPTION

Figure 1:
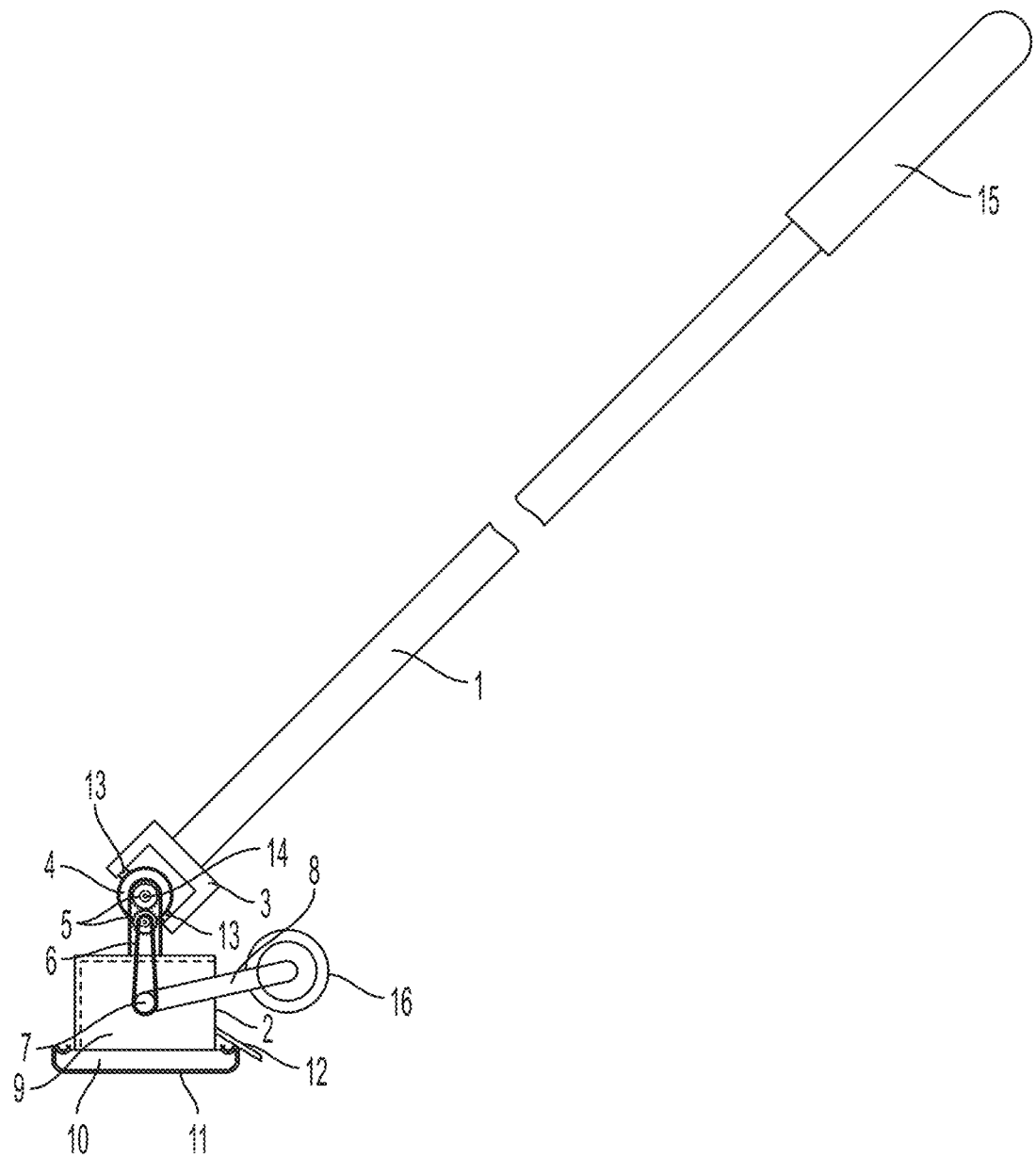
FIG. 1 is a side view of the invention in a first position.

While the invention will be described in connection with several preferred embodiments, it is to be understood that the invention is not limited to these embodiments. On the contrary, the invention includes all alternatives, modifications, combinations, and equivalents as may be included within the spirit and scope of the appended claims.

The present invention relates generally to devices for cleaning surfaces.

In the art of devices for cleaning surfaces, there exists a multitude of appliances that each serve a particular function. There are vacuums (that may or may not include a brush roll), there are sweepers (brush-roll only devices), and there are mops and wiper devices. Each has their distinct advantages and disadvantages. The invention at hand seeks to inventively improve upon these devices by combining the positive attributes of each without being encumbered by the negative attributes of each in new and novel ways.

The present invention is a new and novel structure(s) for cleaning surfaces. Embodiments may include; a wiping surface, which may be disposable; a brush-roll larger debris gathering mechanism; a local debris storage and/or staging area, and a larger remote debris storage structure. Additionally, there are mechanisms and structures disclosed for powering the brush roll, activating the brush roll, and moving the waste from one area to another.

One of the problems with a traditional vacuums is that it can only pick up small debris, yet really small debris on relatively smooth surfaces such as a bare floor etc. are better left to a wet-mop/dry mop/disposable wipe type appliance.

Then larger debris such as nuts, bolts, pieces of cereal are best left to a sweeper, or a broom and a dustpan, as the suction of an atmospheric vacuum based system is limited. Additionally, a vacuum typically is large and cumbersome to maneuver and get into tight areas, under cupboards, next to toilets, around furniture etc. and is not conducive to quick cleanups.

While a sweeper can get some of the larger debris, it fails at getting the fine dirt that a vacuum or a mop/wiper can get, it tends to throw it around. So it lacks those attributes a vacuum and a mop/wiper has.

One of the paramount problems with existing wet/dry mops is their inability to pick up debris of a larger given size. Once it is larger than sand/hair etc. it just gets pushed around. The problem with putting a traditional brush roll out front, is that the positive attributes of leading with a wipe (into corners etc.) would be obviated, and a brush roll cannot be trailing, in the rear, as the wipe would "snowplow" everything before the brush roll had a chance to do its job.

So while there is a functional crossover between these three, not one does all. And so this invention addresses these shortcomings with a new and novel configuration.

A brush roll is used in conjunction with a mop/wiper, whether it be of the wet or dry, disposable or permanent type. The brush roll, may or may not be only in selective contact with the surface to be cleaned. The brush roll may be powered by friction wheel(s) and gearing from movement on the surface to be cleaned, such as manual sweepers are and is known in the art. Alternatively the brush roll may be powered by an electric motor, a wind up motor, an air turbine etc. In one mode of use the mop pad/foot/block shaped structure/head 10 leads and then when debris is encountered, the brush roll is lowered and it then can do its work. The brush roll may be mounted to the front, and lowered by a mechanism, a trigger, a motor etc. initiated by the user or another input. This is not shown directly in the figures, but is very close, nearly identical, to the configuration of FIG. 2, which will be discussed in detail below.

A preferred embodiment though is to have the unit have two discrete positions. One is where the pad/foot/block shaped structure/head 10 leads, and the brush roll follows at a disengaged position from the surface to be cleaned. This keeps the brush roll clear from obstacles such as furniture and walls, and allows the pad to get as close as possible, and also allows the user an unobstructed view of the cleaning area of the leading edge. The second position is where the entire unit has been swiveled/pivoted around once larger debris is encountered. Now the brush roll is leading. A very important aspect is that this configuration allows the unit to be used like a broom, pulling debris out from corners, getting close to chair legs, making a pile of debris, and then swiveling the unit around, for the second position to sweep up. This is very different than the mode of using a vacuum or traditional sweeper, although this unit allows that mode of cleaning as well. It can accomplish both.

The brush roll may be lowered by a trigger or other input from the user, or by another input such as a positional or debris sensor. And it may be powered by its frictional interface, or another wheel to the surface to be cleaned, or by an electrical input by the user inputting a switch or by electrification due to a positional switch, sensor or other input. In a preferred embodiment, the swiveling and reorientation relative to the handle accomplishes the lowering of the brush roll arm 8 to the surface to be cleaned, and may further activate the switching electrification of an electric driven (in this embodiment) brush roll 16.

So now, this last preferred embodiment, just outlined, will be discussed in greater detail.

The following reference characters are used in the drawings to refer to the parts of the present invention Like reference characters indicate like or corresponding parts in the respective views.

Figure 2:
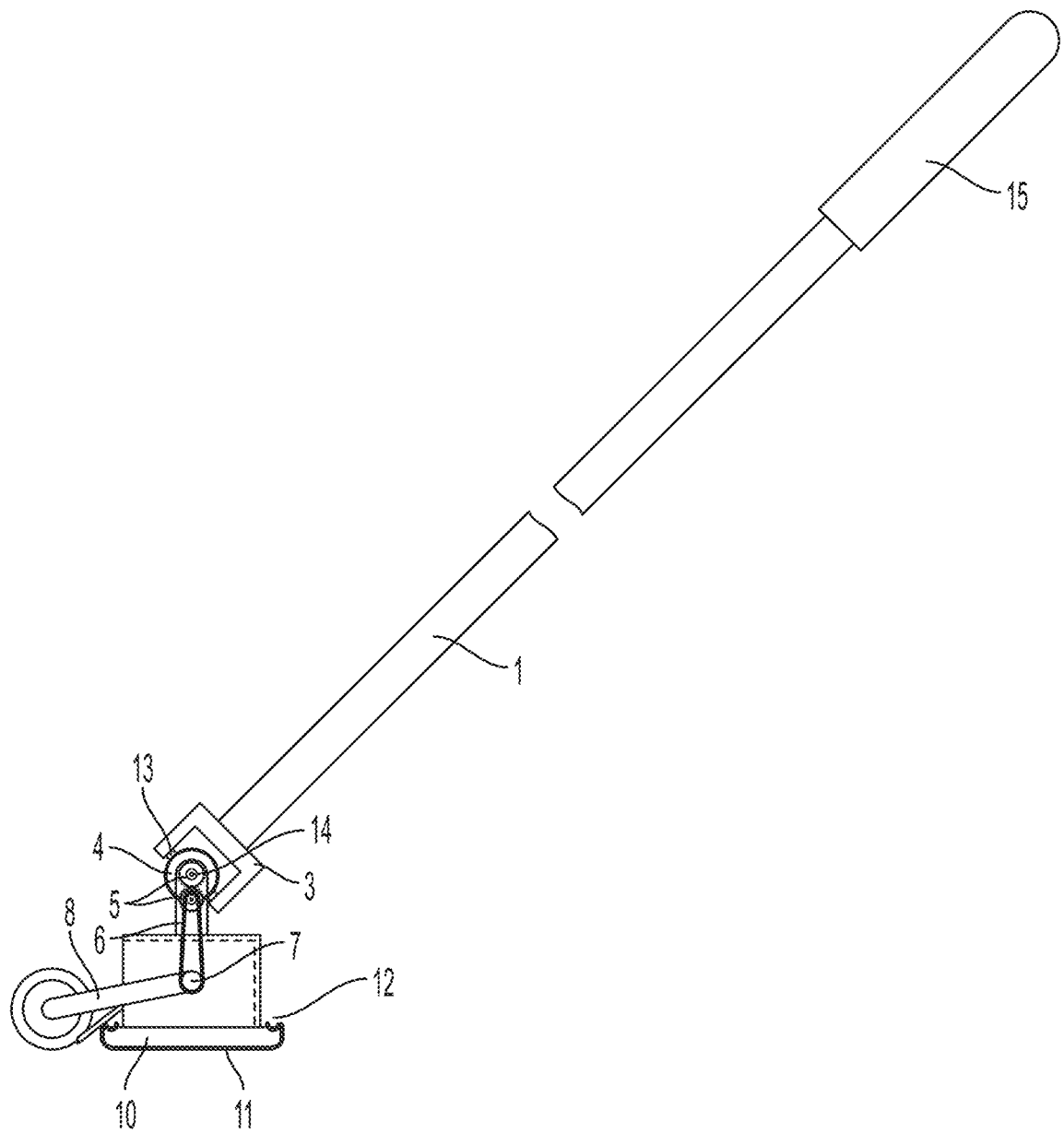
FIG. 2 is a side view of the invention in a second position.
Figure 3:
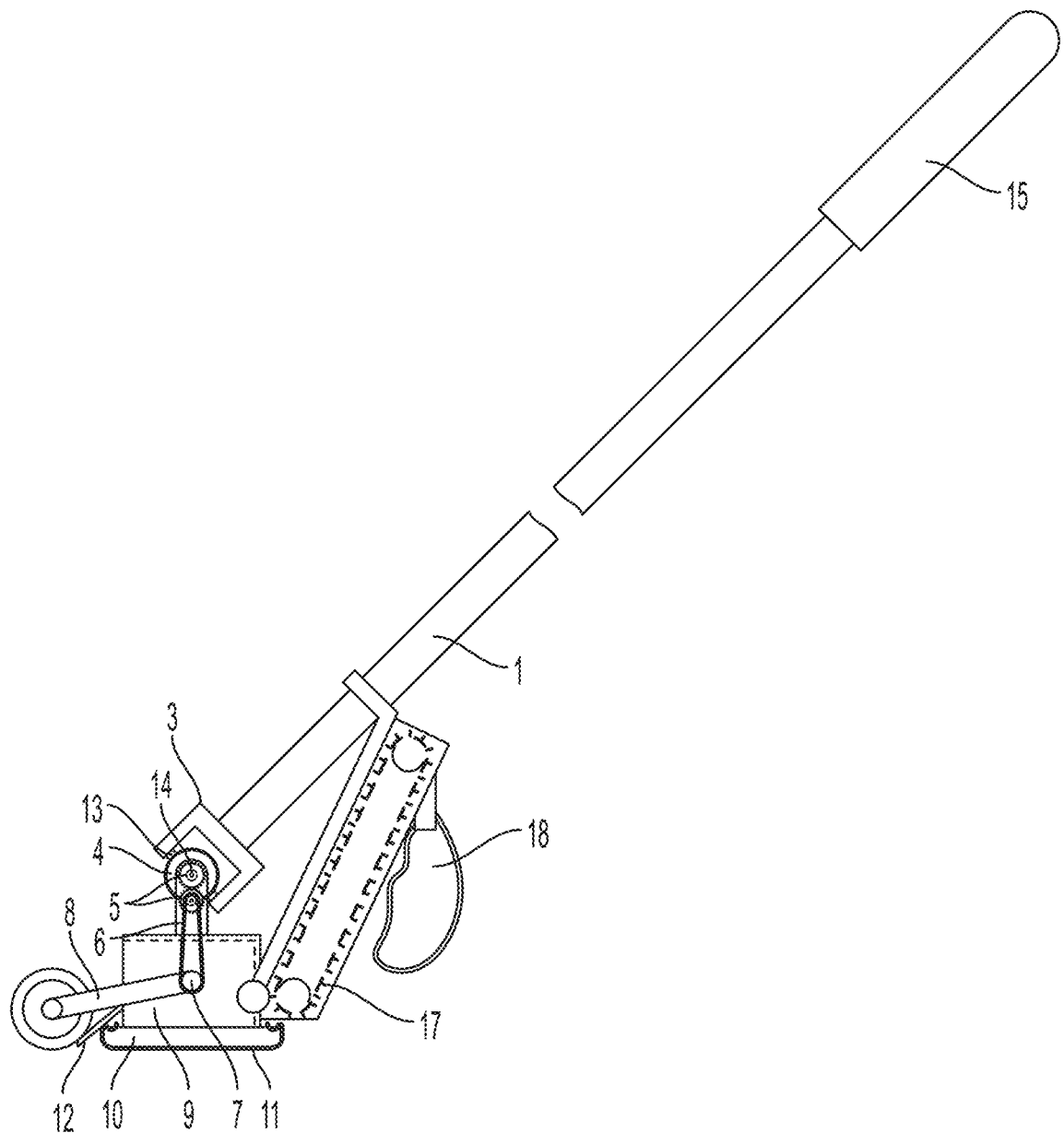
FIG. 3 is a side view of the invention in a second position and showing another embodiment that includes novel methods of further moving debris from the floor via a conveyor belt like system or an auger. Such a further system may further contain the debris into a larger area, or conveniently into a bag, perhaps generically disposable such as used grocery bags, illustrated by 18.

1—handle upright
2—Receptacle opening
3—Side to side Pivot block
4—Front to back pivot element
5—Gears for transmitting motion/and/or—reversing motion
6—Belt drive for transmitting motion/and/or reversing motion
7—Pivot of arm 8
8—Brush roll arm
9—Debris receptacle
10—Sweeper Pad holder/foot/block shaped structure/head
11—Sweeper cloth
12—Debris ramp
13—Pivot of 3
14—Pivot of 4 and pivot of one of 5
15—Handle grip area
16—Brush roll, may be bristled or a flap like or bladed (rubber/elastomeric etc.) structure.
17—Conveyor structure—may be a conveyor belt or an auger etc.
18—Receptical may be a bin, a bag—permanent or disposable.
19—Cam
20—Brushroll flute
21—Pickup edge, bristles, elastomeric or just the edge of the spiral auger etc.
22—Brushroll center
23—Brushroll pivot
24—Cleaning sheet to be affixed to and/or wrapped around pad 10
25—Sheet gripper
26—Stabilising foot
27—Motor and/or brush-roll drive
28—Elastomeric blade-extruded or molded-can also be made/molded with brush-roll 16
29—Retention cap
30—T-groove for 28
31—Center of chevron shape/brush roll mirror line
100—Tank module
101—Handle and pivot assembly
102—Disposable debris bin liner
103—Main debris bin
104—Sweeper module
105—Universal Main pad
106 Pre-moistened mopping pad
107—Wet mopping pad 107 or other wet mop; and
108 Dry Mopping pad Referring to FIGS. 1 to 3, side views of the invention can be seen. A device for cleaning floors can be seen. Devices such as these are often used as a wet or dry mop. Some of these devices can accommodate disposable wipers, be they wet or dry. Several of the embodiments of this invention are able to incorporate such wipes. FIGS. 1 and 2 show the invention in two different positions, and FIG. 3 shows an alternative embodiment(s) to the invention.

FIG. 1 shows that the invention may include a handle upright 1, and may further include a universal type joint made up of a side to side pivot block 3, its associated pivot points 13 which pivot generally fore and aft on front to back pivot element 4. In this way the pad can swivel generally 180 degrees while remaining on the ground by the user pivoting their hand and the handle a generally equivalent amount. Another equivalent structure(s) may be substituted and still be within the spirit and scope of the invention.

Now it can be seen that the invention includes a drive associated with the pivot 14 of 4 front to back pivot 4. The drive in this case includes a gear(s) 5 which then drives belt 6 which is operatively connected to 7, pivot of brush roll arm 8. Any number of gears or belts or other linkages etc. may be substituted to achieve a similar function. The result is a structure that is capable of changing modes from having a brush roll in an out of the way/out of use position, to having the same brush roll having an in use position. In this embodiment the user uses the implement as in FIG. 1 as a traditional mop, be it wet or dry, be it with semi-permanent cloths, or disposable of the Swiffer™ style from the Proctor and Gamble company or equivalent. The user is able to use these cloths or wiping surfaces unimpeded by a brush roll or similar structure, and thus is able to get close to items, areas, under areas, and also be able to see the point of cleaning of the pads etc., with an unobstructed view.

Incidentally, a brush roll may be bristled or not, as it may be a bladed (elastomeric) structure, a non-roll like structure such as spinning discs etc., it (brush roll) is just a catchall of all terminology used for those structures which perform a general sweeping agitating function. Referring back to the figures, then when the user wants to use the brush roll or similar structure, the user swivels the entire structure about the handle so that what was the back of the structure, where the brush roll 16 and opening 2 is now in the front as can best be seen in FIG. 2. In doing so, the angle of the handle to the rest of the structure has changed in a generally "mirrored" way from FIGS. 1 to 2. And 4 thus drives pivot 14 which drives gears 5, driving belt 6 and pivot 7 bringing brush roll arm 8 down and thus brush roll 16 into active contact with the surface to be cleaned and into a cleaning position into the front of the unit where it will encounter larger debris before the wiping pads and may deposit it into debris receptacle 9 via receptacle opening 2 via debris ramp 12. In conjunction with this movement, the brush roll or similar structure is brought into rotary power.

One anticipated mode is by way of an electric motor (not shown). The action of bringing the sweeper brush roll or other structure into contact with the surface to be cleaned can simultaneously activate a switch, which may be located at one of several points in the associated moving linkage, or be directional sensing so that when the unit is flipped/rotated, it becomes activated. In an alternative embodiment, the switch is located on the handle generally near the users hand, or lower on the base or "foot" of the unit. In another alternative embodiment, the brush roll or alternative structure is powered frictionally from drive wheels or other structure in contact with the floor or surface to be cleaned.

Another important feature that is applicable to versions of all embodiments is that the mechanism may be allowed to "over-travel" as far as the brush rolls engagement with the floor, and be spring loaded. In this way, a wide variety of in use handle positions may be supported, and so the position of the brush roll is not absolutely "clocked" into the rotation of the handle, thus once it is in contact with the floor, there is variance in the angle of the handle allowable because a spring biasing or other biasing force keeps the brush roll in active contact.

Additionally, appropriate structures such as wheels, friction blocks etc. may be used to make sure the brush/flap roll is in appropriate contact, but not too frictionally in contact with the surface to be cleaned. An alternate to having it spring loaded is to use gravity when the unit has been lowered. In this way, as with spring loading, the unit may even ride, or "crawl" over debris that normally would be too large for its brush/flap clearance and its diameter. Another important note is that while the movement of brush roll arm 8 and the brush roll 16 was activated by pivots 14 of 4, it also could be keyed into pivots 13 of 3 of the universal-multi-axis-gimble-pivot structure depicted. So it could be keyed into pivots 13 instead of, or in addition to being keyed into pivot(s) 14 so a variety of actuation movements/motions is anticipated.

It should be noted that features of all the embodiments disclosed in this disclosure may be combined and recombined in various ways, and combined with a unit that is not "flappable" as well. In those embodiments, the brush roll may be on the front of the unit, and either always on contact with the surface to be cleaned or lowerable and raisable on the front as has already been described in detail with regard to flippable embodiments.

Now referring to FIG. 3, another embodiment can be appreciated. This view has many similarities to FIG. 2 in that the brush roll etc. is rotated to the front etc. Of note is powered Conveyor structure 17 which as depicted may be a conveyor belt or alternatively, may be an auger (not depicted) etc. Also shown is receptacle 18. This receptacle may be a bin, or a bag-permanent or disposable. In this way the debris may be moved from the floor or surface to be cleaned or from debris receptacle 9 so that the unit may have increased cleaning capacity. Additionally, it may be easier for the user to empty the debris, and additionally further the user may use disposable bags perhaps even of the grocery variety to dispose of the debris without ever having to touch it or have a dust plume from dumping the waste. The auger or belt may be powered by an electric motor or by friction wheels/movement of the device relative to the surface to be cleaned as in other embodiments.

Figure 4:
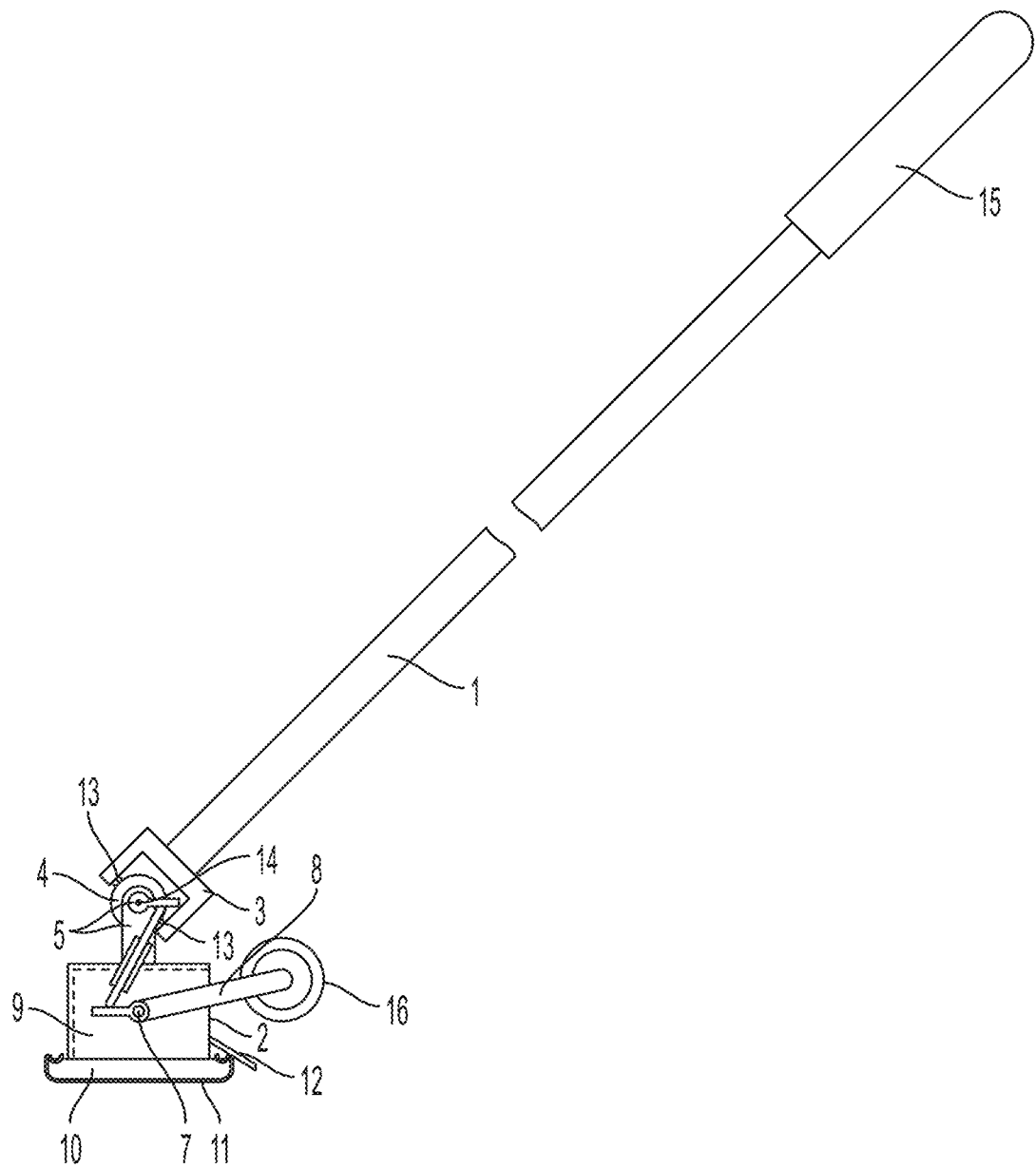
FIG. 4 is a view similar to FIG. 1 in that it is a side view of the invention in a first position. The predominant difference(s), is that an alternate linkage arrangement incorporating a sliding piston-link is depicted.

Referring to FIG. 4 is a view similar to FIG. 1 in that it is a side view of the invention in a first position. The predominant difference(s), is that an alternate linkage arrangement incorporating a sliding piston-link is depicted.

Figure 5:
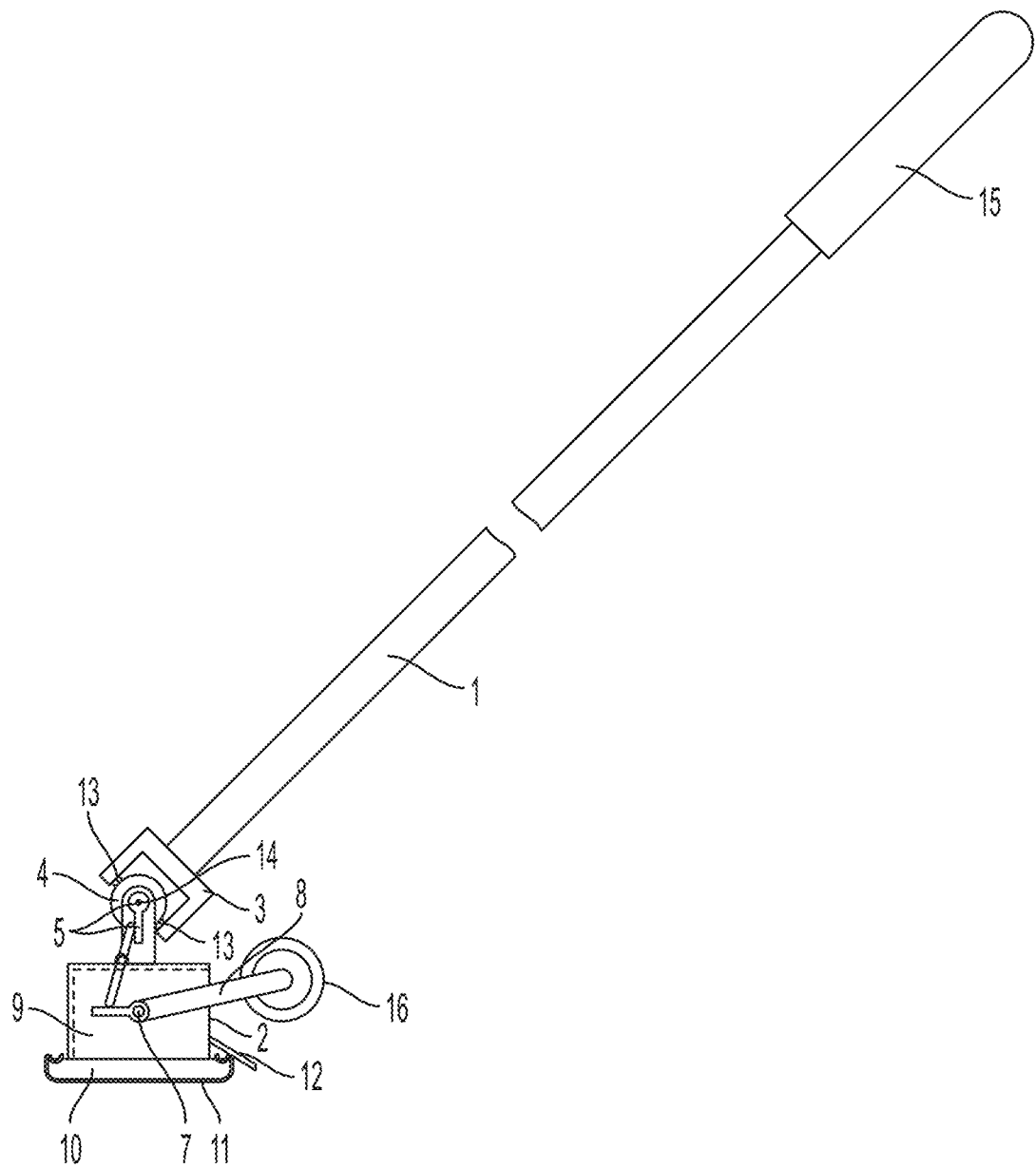
FIG. 5 is a view similar to FIG. 1 in that it is a side view of the invention in a first position. The predominant difference(s), is that an alternate linkage arrangement is depicted.

Referring to FIG. 5 is a view similar to FIG. 1 in that it is a side view of the invention in a first position. The predominant difference(s), is that an alternate linkage arrangement is depicted.

Figure 6:
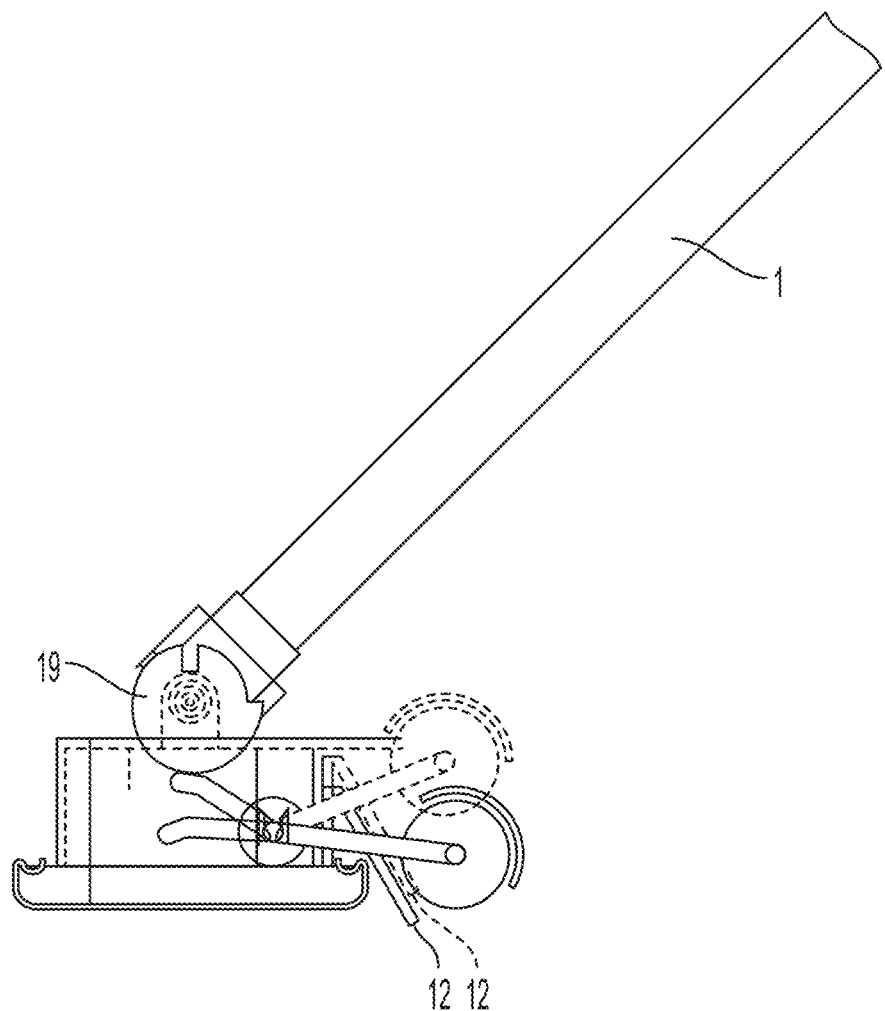
FIG. 6 is a side view of the invention in a first position. One difference(s), is that an alternate linkage including a cam 19, arrangement is depicted. Further alternate linkages include partially geared interfaces for producing intermittent, and/or phased movement as the levers, belts and cams of other alternative embodiments/versions thus illustrated. Also depicted in this view is a movable debris ramp.

Referring to FIG. 6 is a trimetric view of the invention in a first position. The predominant difference(s), is that an alternate linkage including a cam 19 arrangement is depicted. Further alternate linkages include partially geared interfaces for producing intermittent, and/or phased movement as the levers, belts and cams of other alternative embodiments/versions thus illustrated.

Figure 7:
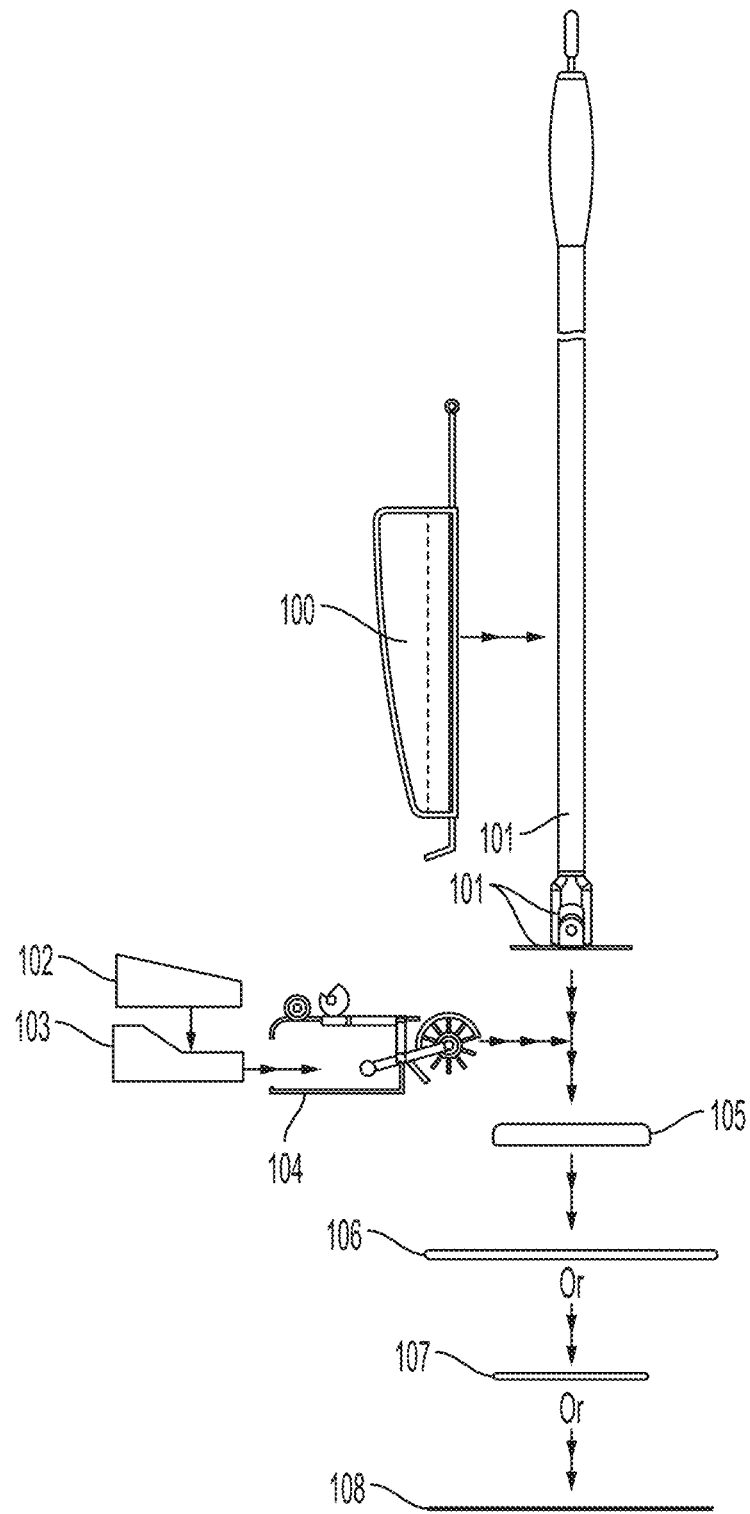
FIG. 7 is a view similar to FIG. 6. This illustration depicts how the invention may have embodiments that are modular in structure, in that it is a side view of the invention in a first position. The predominant difference(s), is that an alternate linkage arrangement is depicted.

Referring to FIG. 7 is a view depicting how the invention may have embodiments that are modular in structure.

Also of note is that that the rotation of the brush roll could power a clutch etc. to lower the brush roll boom.

As previously noted various linkages are anticipated including pivot bars, cams, gears, partially geared members, the inclusion of a partially geared "drop-off" linkages, belts, Geneva mechanisms, etc. and various combinations of each.

Also disclosed are embodiments with the possible inclusion of (optionally folded/foldable), disposable debris boxes for wet or messy debris. This could be a box in mother box design, or a disposable box in a reusable box in a mother box/mounting area. In other words, there may be an area on/in the device for holding debris as already described. This area, may also, optionally, hold another holding area (box)

that is removable and may or may not be disposable. In this way, it may be removed, and dumped without having to invert the entire mechanism. If it is disposable, it may be emptied, or simply thrown away. Additionally, if it is not disposable, it may optionally include its own disposable liner. In this way the user can either use the removable reusable/non disposable debris tray or box, and optionally line it with a disposable liner.

Also disclosed are embodiments with the possible inclusion cover or lid for the general entry-way of the aforementioned debris area. This may be spring loaded, and/or activated by a clutch.

This door may be attached or part of the broom, and/or the debris ramp, and/or brush/flap roll fender. This can be generally seen in FIG. 6, where debris ramp has a lowered position when broom and brushroll/flaproll are lowered which is indicated by both in solid lines. And then when broom and brushroll/flaproll are raised which is indicated by both in dashed lines, the ramp or an associated section of it (as shown) or a separate non associated section (not shown) acts as a cover for the debris collection area.

So as depicted, the cover or lid opens with the lowering of the broom and/or becomes the debris ramp and thus also gets out of the way of the pad for use and pad changing. This ramp may only go down close to the floor, and may further include a flexible member like a squeegee, hinged or not, thus allowing the pad to still do the fine cleaning.

This inclusion of the ramp moving up and down—can be especially important for wet floor cleaning.

Also disclosed are embodiments with the inclusion of spring loading of the entire unit relative to the handle, so that when it is stored, the debris box is facing upward. This would put the unit into a position so that the debris would not fall out. Also disclosed are embodiments where the unit is structured so that it may be built up of individual components, and thus assume several distinct configurations. This serves several distinct advantages. One the unit may be sold as components, thus limiting the shelf-space/SKU's that a retailer or distributor may have to house/inventory. The unit may be upgradeable by the user at a later time. The manufacturer or distributor can mix and match components thus saving tooling and inventory expenses. And the components may be easily replaceable. By referring to FIG. 7, one such example of a system is illustrated. It can be seen that there are systems of just dry wipes, and of pre-wetted-wet wipes, and a sweeper unit may be added, as can a non-pre wetted wet wipes that are to be used with a wetting system or a fluid bottle. The components could be all individualized and simply plug together, or may be pre-combined into pre-sub configurations. Referred to in FIG. 7 are wetting type tank module 100; handle and pivot assembly 101; optional disposable debris bin liner 102; main debris bin 103; sweeper module 104; Universal Main pad has both top press-locks and Velcro® or similar hook and loop type fasteners/locks 105; pre-moistened mopping pad 106; Wet mopping pad 107; and Dry Mopping pad 108.

Figure 8A:
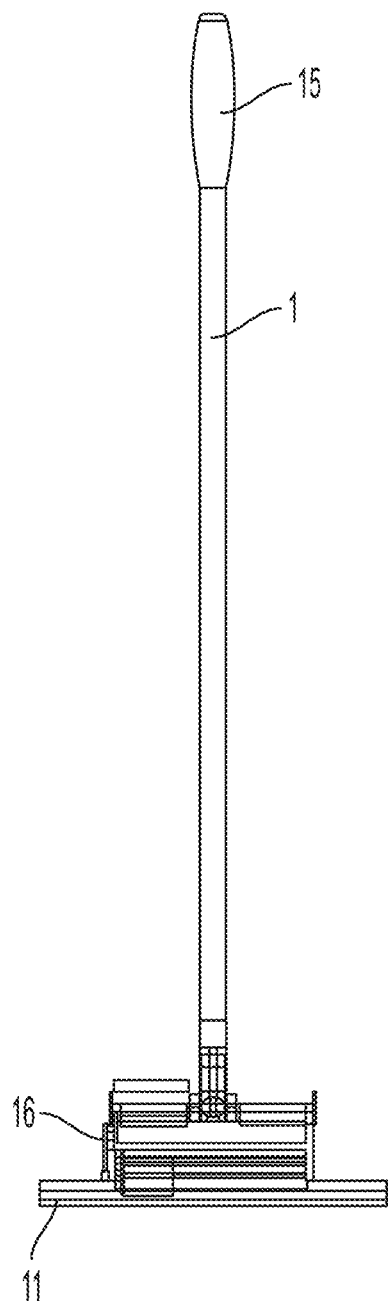
FIGS. 8A, 8B, and 8C are a collection of three views of embodiments of the invention. From left to right there is a rear view (FIG. 8A), a rear trimetric (FIG. 8B), and a side view (FIG. 8C).
Figure 8B:
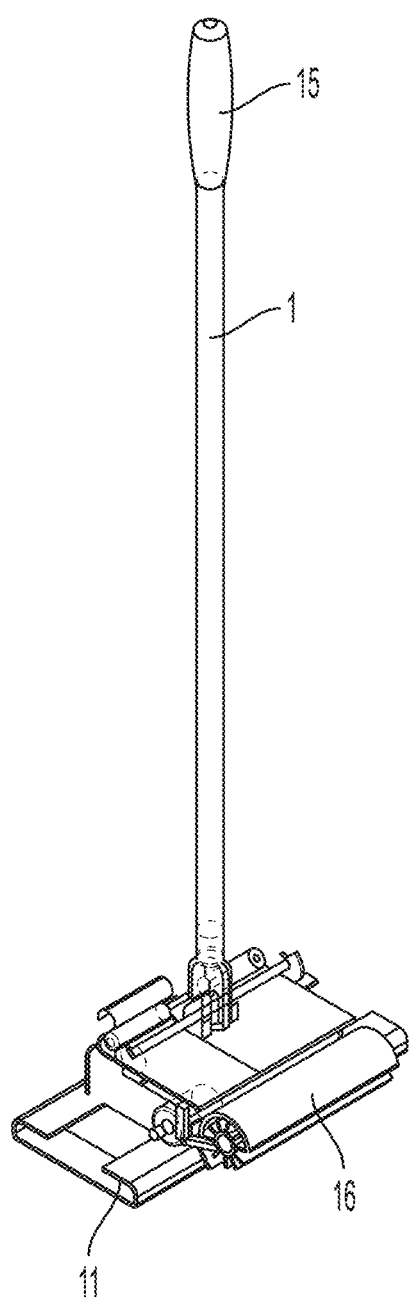
Figure 8C:
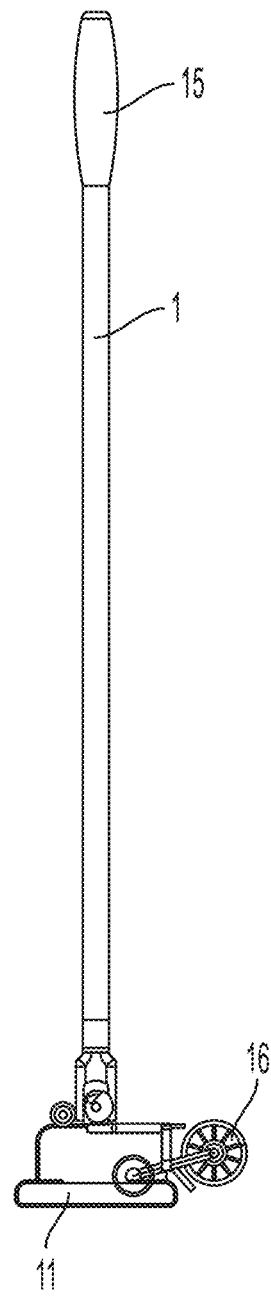

FIGS. 8A, 8B, and 8C are a collection of three views of embodiments of the invention(s). From left to right there is a rear view (FIG. 8A), a rear trimetric (FIG. 8B), and a side view (FIG. 8C).

Figure 9:
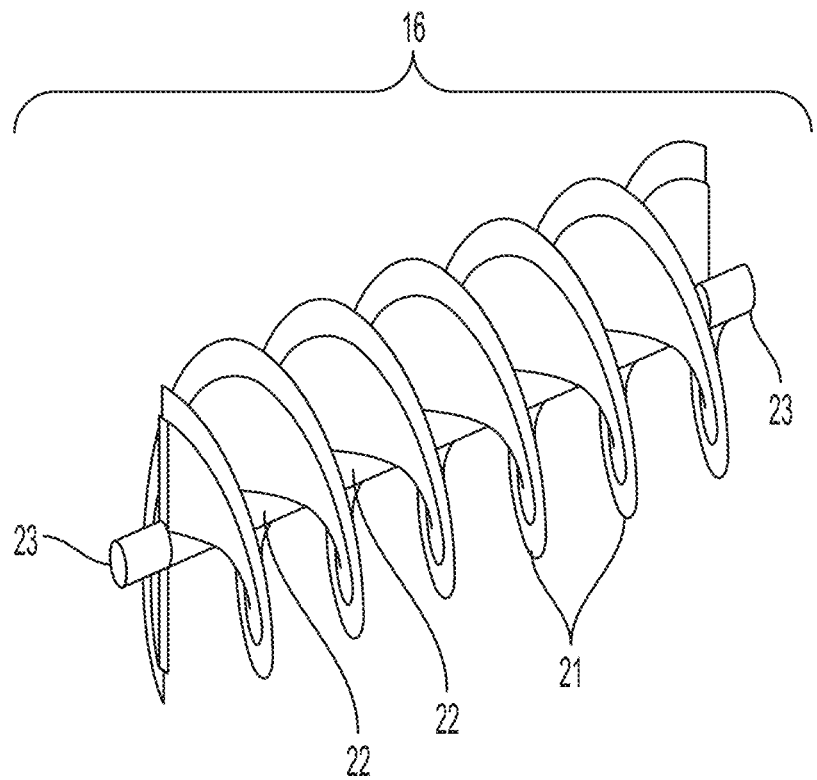
FIG. 9 is a trimetric of a novel contemplated brush roll of the invention with a single flute and multiple spirals along its length.
Figure 10:
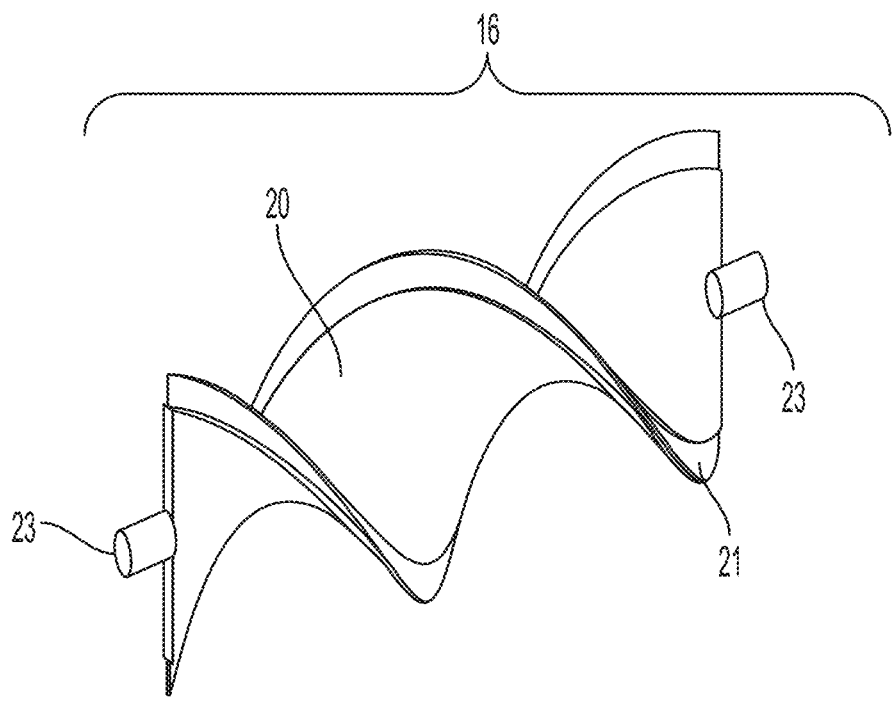
FIG. 10 is another trimetric of a novel contemplated brush roll of the invention with a single flute and a single spiral on its length.

Now referring to FIGS. 9 and 10, a common problem with current brush-roll design and function is that they have a tendency to blow very small and very light debris away from the brush roll due to the wind they generate due to their rotation. The brush rolls in FIGS. 9 and 10, solve this problem. The brush roll itself is geometrically configured to be "fluted". This may be a single flute, or multiple flute. By doing so creates an airflow that is transverse or axial. So the action is that there is not negative/blowing airflow, but an airflow that is optimized to flow in the auger/screw structure being disclosed.

Brush rolls have been constructed where the bristles radiate in a spiral manner, however this disclosure is structurally different. The current state of the art includes bristles that are relatively long, fairly loose and thus fairly air-permeable and thus are unable to created a "structured-purposed wind". Whereas, in this structure, the "roll" in brush roll, is minimized and/or eliminated. Instead, the majority if not all of the structure is made of a spiral with optional edging. This edging may be relatively short bristles, or may be an elastomeric type material found on flap brush-rolls. In any case, the density of the design, either through the materials selected, or through the closeness/shortness of the fibers creates a relatively un-air-permeable structure. The net result is that the entire unit acts as an "air-auger" or "air-screw" with the airflow at least a part of which is axial and minimizes forward debris blowing wind, which is a new structure and result. This new and novel brush roll may be used on non-suction sweepers, as well as sweepers with suction, as they both suffer from "debris blow away" before the unit may sweep up the debris, or before the suction may overcome the wind created by traditional brush rolls.

Again, referring to FIGS. 9 and 10, FIG. 9 is a trimetric of a novel contemplated brush roll of the invention with a single flute and multiple spirals along its length. FIG. 10 is another trimetric of a novel contemplated brush roll of the invention with a single flute and a single spiral on its length.

Note that these figures depict a single fluted design where there is one flute with a variable pitch, i.e., distance between crest and crest etc. however, a multiple flute design is also anticipated where there are more than one auger spirals on the same structure, much like a multiple flute thread design in fasteners such as bolts etc.

Also while the term "brush roll" is being used, it is only for continuity of what is known, as some of this disclosure and embodiments are "roll-less" or alternatively nearly so, and this is actually a distinguishing point.

Referring to FIG. 9, a brush roll or pickup auger can be seen there is a flute 20, a pivot 23, an edge 21 which is either just an edge, or another material such as a squeegee type edge, or bristles, cloth etc. Also there is a minimalistic "roll" 22 so that the auger or flutes are nearly maximized.

Referring to FIG. 10 another embodiment can be seen. In this embodiment there is no roll whatsoever—it is purely a twisted flute. So here the entire "diameter" of the rotating surface is being used as an air auger, truly maximizing its efficacy.

With either of these embodiments, it is anticipated that these auger-brush rolls may be made by twisting an extrusion(s), or injection molding, casting etc, or a combination of these processes.

Figure 11:
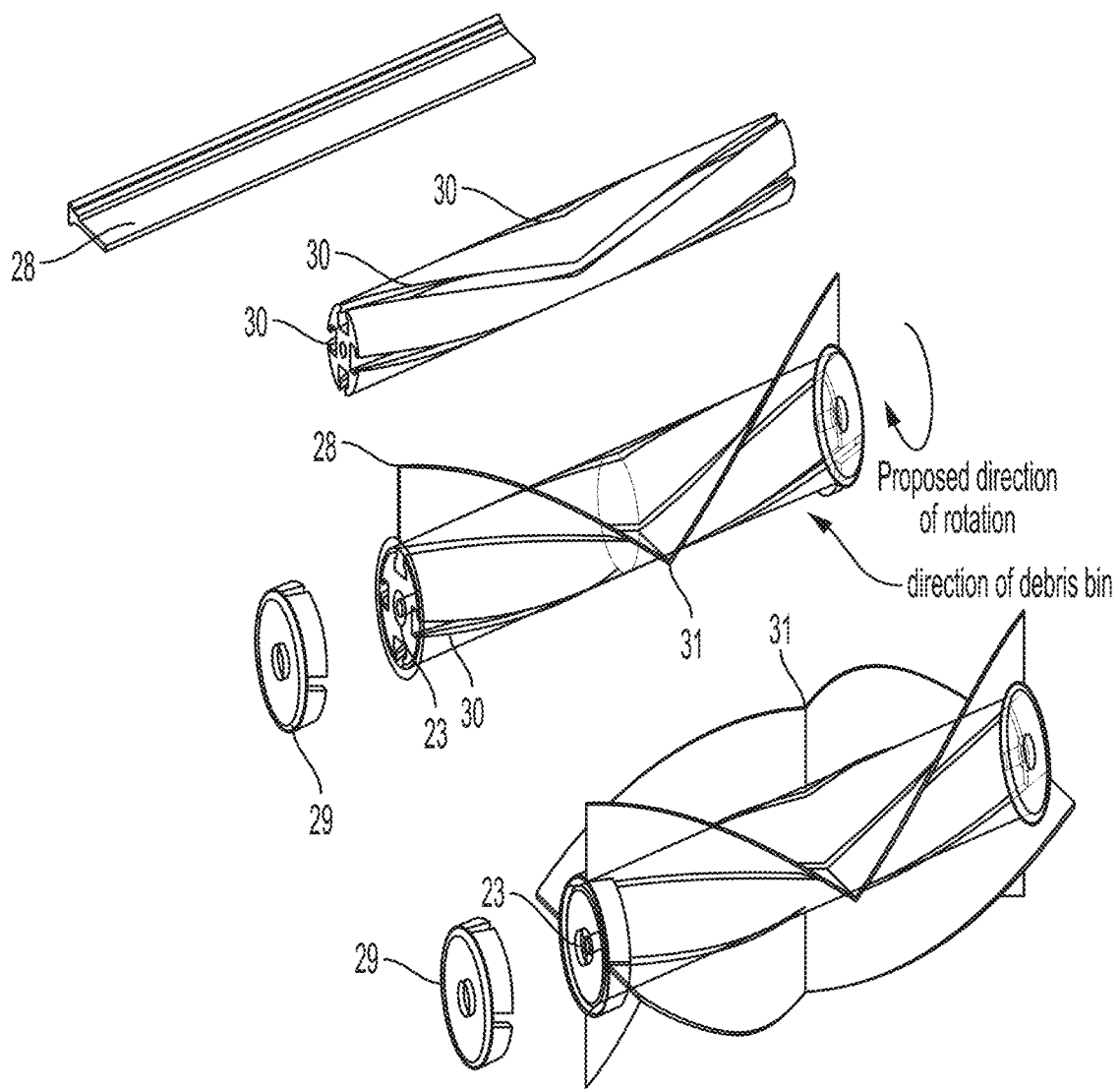
FIG. 11 is a sequential series of trimetric views of another novel contemplated brush roll of the invention. Starting at the top left is a brush-roll 16 with T-grooves 30 for accepting elastomeric blades, 28/(21) which can be extended or molded and inserted into the groove(s) 30 or alternatively—can also be made/molded with brush-roll 16. Also retention cap 29 can be seen for retaining elastomeric blades 28/(21) in groove(s) 30. Next can be seen the center core 16 without the blade(s) 28. Next can be seen a core with a blade(s) inserted. Next can be seen a core with more blade(s) inserted and the end cap(s) 29 and the way in which a "V" or chevron shape can be created.

Now referring to FIG. 11 a brush roll with many similarities to the brush roll of FIGS. 9 and 10 can be seen. FIG. 11 is a sequential series of trimetric views of another novel contemplated brush roll of the invention. Starting at the top left is a brush roll 16 with T-grooves 30 for accepting elastomeric blades, 28/(21) which can be extruded or molded and inserted into the groove(s) 30 or alternatively—can also be made/molded with brush roll 16. Also retention cap 29 can be seen for retaining elastomeric blades 28/(21) in groove(s) 30. Next can be seen the center core 16 without the blade(s) 28. Next can be seen a core with a blade(s)

inserted. Next can be seen a core with more blade(s) inserted and the end cap(s) 29 and the way in which a "V" or chevron shape can be created.

FIG. 11 is similar to one half (axial length) of the brush rolls of FIGS. 9 and 10, and then the second half is a mirrored duplicate of the first half. In this way a twisted, undulating "V" section or chevron shape is created. In this case the brush roll is "bladed" with an elastomeric blade that is suitable for both dry and wet debris, and does not become easily fouled. It has been found that having the chevron or "V" section pointing downward, as depicted, produces a negative pressure or sucking action, thus drawing hair and small debris towards the center of the roll. This is not so when the spiraling chevron is pointed, or rotating upward. However, this drawing or sucking action can have negative effects on the debris—bin side of the device, but it has been found that various geometries can be employed to overcome this negative action while preserving the positive action of this unique geometry on the opposing side of the brush roll. In some embodiments the debris bin has a vertical wall or lip after the debris ramp, thus holding the debris after it has been thrown by the brush roll, thus preventing the debris from being redrawn into the axial centerline of the brush roll.

Again with any of these embodiments, it is anticipated that these auger-brush rolls may be made by twisting an extrusion(s), or injection molding, casting etc, or a combination of these processes.

As previously discussed, some embodiments employ the use of a switch to turn on the brush roll when the unit is pivoted around generally 180°. One problem that has been encountered is that to accommodate all users the brush roll should turn on when the handle is at a given angle, for example 60°. This is fine for users that are always pushing and pulling the unit with one of the two working edges consistently facing towards or always from them. However, there is a certain percentage of users that exhibit an "extreme swiveling maneuver" whereby they push the unit away from themselves with a given leading-edge/face and then twist the handle, and bring the cleaning head back towards themselves with the same leading edge/face now coming towards or pointed at the user. Then they again twist the handle causing the leading edge to again be facing or pointed away from the user and they then push forward. And this sequence is repeated x number of times depending on the user. The problem with this situation is that if the unit turns on automatically when the handle is at a given angle going the other direction the users that exhibit this extreme swiveling maneuver will either be turning the unit on unintentionally when the brush roll is trailing, or conversely turning the brush roll off unintentionally when the brush roll is leading.

Several inventive solutions have been employed to address this and other issues. These inventive solutions, structures and methods may be used in conjunction with a switching system that automatically turns the brush roll on when the handle/cleaning head is rotated, or these inventive solutions, structures and methods may be used to replace or supplant the various orientation-switching structures already laid out whether they be positional switches activated by the linkage etc. Additionally, these inventive solutions, structures and methods may or may not be selectively used in conjunction with lowering mechanism system that automatically lowers the brush roll on when the handle/cleaning head is rotated.

One such inventive solution is to have a "delay" feature where the brush roll does not activate or turn on for a given time period after the unit/head has rotated around. In this way the user can complete an "extreme swiveling maneuver" without turning on/activating the brush roll prematurely. This delay can be applied to just the rotation of the brush roll, or to the lowering linkage as well. This delay can be accomplished mechanically, electrically, or electrically through the use of a microcontroller or equivalent.

Another such inventive solution already mentioned is to have a pushbutton switch. Such a switch may be on the handle or the foot of the device. A novel switch geometry is to partially submerge the switch. In this way the switch is not easily activated when the handle has the switch facing downward generally in the users palm and the brush roll is in a generally "trailing" position. Then when the handle is rotated, and the brush roll is now in its generally leading position/orientation, the switch is facing upward and is easily accessible (even if submerged) with a user's thumb or finger. In the case of a wet process mopping device, two switches may be used on opposing sides of the handle. Thus when one is dispensing fluid, a fluid dispensing switch/button is facing upward and the brush roll may be trailing. Then when the unit, handle and thus foot, is rotated, the switch for activating the brush roll is then facing upward. As before, the switches may be submerged or configured in such a way such as a relatively flush tactile switch that is not easily activated when facing down/towards the users palm, but easily activated when facing upward. Other configurations that are equal and opposite are anticipated as well. In these embodiments, the button/switch is more easily activated when facing downward as opposed to facing upward.

Another embodiment that can be selectively used with any of the aforementioned switching scenarios is a switch (additional and additive) built into the swivel. The way in which this works is that when this swivel switch has pressure in one direction, on the handle the switch is "closed". Conversely, when the when this swivel switch has pressure in the opposite direction on the handle, the switch is "open". So when a user is executing an "extreme swiveling maneuver" and the brush roll is trailing, the user is pushing on the swivel keeping the swivel-switch closed, however the linkage switch is open because of the handle orientation. Then when the user has swiveled the pad around and the leading edge of the pad is now coming towards the user, as has already been outlined, the user is pulling on the swivel switch which opens the switch. Thus even though the linkage/or handle orientation switch has been activated, the swivel switch is "open" because of the pulling action and because it is in-line (series/parallel) with other switch(es), the brush roll does not turn on when it is trailing even though it is going through the "extreme swiveling/swiffering maneuver".

Another embodiment that can be selectively used with any of the aforementioned switching scenarios is to employ a timing device to limit the time that the unit runs continuously for. So a user, or the linkage etc., may turn the brush roll on, then off over and over again, though a single continuous run may be time limited without the unit being turned off for a specified period of time. This cycle may be repeated indefinitely. This time limitation can be accomplished mechanically, electrically, or electrically through the use of a microcontroller or equivalent. In the case of a battery operated device this leads to greater battery life. Also in all modes of operation, battery operated or not, this teaches the user to use the device as a "broom/mop and powered dustpan" style or method, as opposed to an "always on" style or method such as a traditional vacuum or sweeper. The reason for this is to encourage the separation of functions that make broom sweeping or "Swiffering" so appealing and functional as a cleaning operation that has already been outlined.

Figure 12:
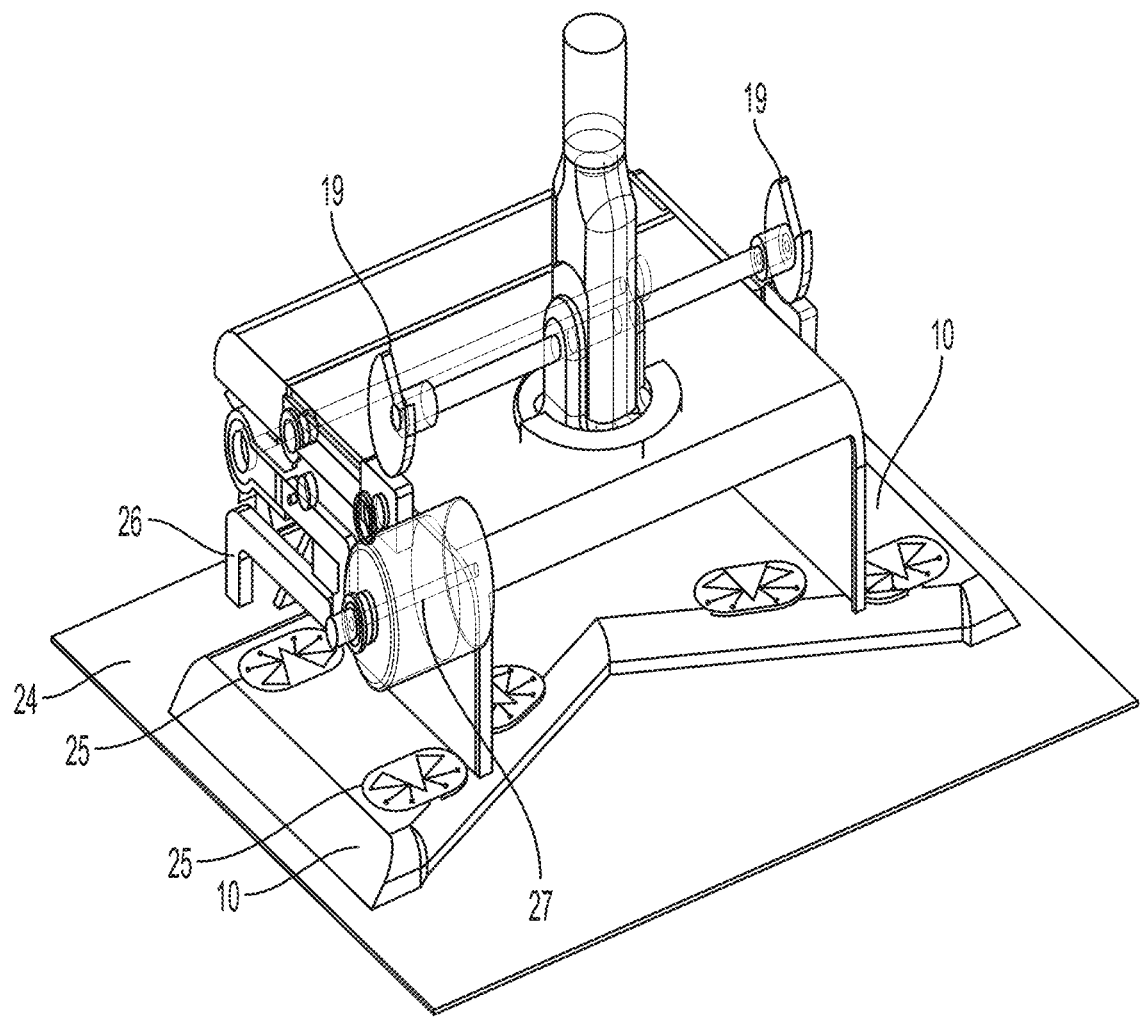
FIG. 12 is a trimetric of a one embodiment of the of the invention, particularly of a foot/pad that has a contemplated shape that geometrically facilitates and encourages gathering and collecting of debris.

Now referring to FIG. 12 a plow foot pad design can be seen. While still using a standard optionally disposable sheet or pad, the foot-pad shape encourages the gathering of debris for subsequent "dust-panning" or pick-up into the bin. Of note is that this shape is also suitable for those applications that don't use a removable sheet or pad as well. This shape can be employed on any side of the pad/foot, but it has been found most advantageous on the side opposite the brush roll side Here as before a floating ramp—weighted and/or spring biased may be employed, as well as a spring biased or gravity weighted linkage to achieve the desired results. Any and all of the aforementioned embodiments may be selectively combined in whole or in various parts and thus yield various novel configurations and device structures.

What is claimed is:

1. A device for cleaning surfaces comprising:
    a block shaped structure for holding a wiping cloth, where said wiping cloth wraps around said block shaped structure on at least one side;
    a handle connected to said block shaped structure;
    a brush roll structure; and
    an interconnection between said block shaped structure and said brush roll structure;
    wherein rotation of said handle from a first orientation relative to said block shaped structure to a second orientation relative to said block shaped structure brings said brush roll from a first position to a second position relative to the surface to be cleaned;
    wherein in the first orientation the handle is on a same side of the block shaped structure as the brush roll structure; and
    wherein in the second orientation the handle is on an opposite side of the block shaped structure as the brush roll structure.

2. The device of 1 further including a motor and a drive connecting said motor to said brush roll structure.

3. The device of 2 where said interconnection includes a linkage.

4. The device of 3 where said linkage includes a cam.

5. The device of 3 further including a switch associated with said linkage.

6. The device of 1 further including a steam generating mechanism.

7. The device of 1 further including at least a first debris box.

8. The device of 7 further including a second removable debris box, disposed generally within said first debris box.

9. The device of 3 where linkage includes a pivot and said motor share at least one common center.

10. A device for cleaning surfaces comprising:
    a head;
    a handle connected to the head; and
    a rotating cleaner disposed on a first side of said head;
    wherein rotation of said handle from a first configuration relative to the head to a second configuration relative to the head causes movement between said head and said rotating cleaner, bringing said rotating cleaner from a first position relative to the surface to be cleaned to a second, lower position relative to the surface to be cleaned;
    wherein in the first configuration the handle is on the first side of the head; and
    wherein in the second configuration the handle is on a second side of the head.

11. The device of 10 further including a motor, and a drive, said drive connecting said motor to said rotating cleaner.

12. The device of 10 where said interconnection between said head and said rotating cleaner comprises a linkage.

13. The device of 12 where said linkage further includes a cam.

14. The device of 11 further including a switch.

15. The device of 10 further including a steam generating mechanism.

16. The device of 10 further including at least a first debris box.

17. The device of 16 further including a second removable debris box, disposed generally within said first debris box.

18. The device of 12 where the linkage includes a least one pivot and said motor and said pivot share a common center.

19. The device of 14, where said switch activates said motor when the rotating cleaner moves from the first position to the second position.

* * * * *